(12) United States Patent
Hua et al.

(10) Patent No.: US 8,250,016 B2
(45) Date of Patent: Aug. 21, 2012

(54) VARIABLE-STRIDE STREAM SEGMENTATION AND MULTI-PATTERN MATCHING

(75) Inventors: Nan Hua, Atlanta, GA (US); Tirunell V. Lakshman, Morganville, NJ (US); Haoyu Song, Edison, NJ (US)

(73) Assignee: Alcatel Lucent, Paris (FR)

( * ) Notice: Subject to any disclaimer, the term of this patent is extended or adjusted under 35 U.S.C. 154(b) by 645 days.

(21) Appl. No.: 12/425,576

(22) Filed: Apr. 17, 2009

(65) Prior Publication Data

US 2010/0266215 A1    Oct. 21, 2010

(51) Int. Cl.
*G06F 17/00* (2006.01)
(52) U.S. Cl. ..................................................... 706/45
(58) Field of Classification Search .............. 706/45–47; 711/100, 103, 108; 707/706, 758, 736, 769
See application file for complete search history.

(56) References Cited

U.S. PATENT DOCUMENTS

| | | | |
|---|---|---|---|
| 2003/0120647 A1 | 6/2003 | Aiken et al. | |
| 2008/0140661 A1* | 6/2008 | Pandya | 707/6 |
| 2008/0140662 A1 | 6/2008 | Pandya | |

OTHER PUBLICATIONS

Aho-Corasick, Efficient String Matching: An Aid to Bibilographic Search, 1975, ACM, pp. 333-340.*
Seo et al., Local Text Reuse detection, Jul. 2008, ACM, pp. 1-8.*
Ni et al., A Fast Multi-Pattern Patching Algorithm for Deep Packet Inspection on a Network Processor, 2007,IEEE, pp. 1-8.*
Kefu et al., Fast Dynamic Pattern Matching for Deep Packet Inspection, 2007, Guangdong-Hong Kong Technology Corporation, pp. 1-6.*
Kumar et al., Advanced Algorithms for Fast and Scalable Deep Packet Inspection, Dec. 2006, ANCS'06, pp. 1-12.*
Ponec, Miroslav et al., "Highly Effecient Techniques for Network Forensics," CCS 2007, Oct. 29-Nov. 2, 2007; Alexandria, VA USA, pp. 150-160.
Irmak, Utku et al., "Improved Single-Round Protocols for Remote File Synchronization," INFOCOM 2005 (Mar. 13-17, 2005), 24th Annual Joint Conference of the IEEE Computer and Communications Societies, Proceedings IEEE 2005, pp. 1665-1675.
Faezipour, Miad et al., "A Real-Time Worm Outbreak Detection System Using Shared Counters," 15th IEEE Symposium on High-Performance Interconnects, Aug. 22-24, 2007, IEEE HOTI 2007, pp. 65-72.
Lu, Hongbin et al. "A Memory-Efficient Parallel String Matching Architecture for High-Speed Intrusion Detection," IEEE Journal on Selected Areas in Communications, vol. 24, No. 10, Oct. 2006, pp. 1793-1804.

(Continued)

*Primary Examiner* — David Vincent
(74) *Attorney, Agent, or Firm* — Mendelsohn, Drucker & Associates, P.C.; Steve Mendelsohn

(57) ABSTRACT

A variable-stride multi-pattern matching apparatus segments patterns and input streams into variable-size blocks according to a modified winnowing algorithm. The variable-stride pattern segments are used to determine the block-symbol alphabet for a variable-stride discrete finite automaton (VS-DFA) that is used for detecting the patterns in the input streams. Applications include network-intrusion detection and protection systems, genome matching, and forensics. The modification of the winnowing algorithm includes using special hash values to determine the position of delimiters of the patterns and input streams. The delimiters mark the beginnings and ends of the segments. In various embodiments, the patterns are segmented into head, core, and tail blocks. The approach provides for memory, memory-bandwidth, and processor-cycle efficient, deterministic, high-speed, line-rate pattern matching.

19 Claims, 10 Drawing Sheets

OTHER PUBLICATIONS

Pao, Derek et al., "Pipelined Architecture for Multi-String Matching," IEEE Computer Architecture Letters, May 2008, 4 pages.

International Search Report and Written Opinion for PCT/US2010/030795 (filing date: Apr. 13, 2010) dated Nov. 12, 2010.

"Variable-Stride Multi-Pattern Matching for Scalable Deep Packet Inspection," by Nan Hua et al., IEEE INFOCOM, 2009, pp. 1-9.

"Winnowing: Local Algorithms for Document Fingerprinting," by Saul Schleimer et al., SIGMOD 2003, Jun. 9-12, 2003, 10 pages.

* cited by examiner

400

WINNOWING WITH $k = 2$ AND $w = 3$

500

SEGMENT PATTERN INTO HEAD/CORE/TAIL BLOCKS ($k = 2$, $w = 4$)

910 — STATE TRANSITION TABLE (STT)

| HASH KEY | | VALUE |
|---|---|---|
| $q_0$ | id | $q_{14}$ |
| $q_0$ | ent | $q_1$ |
| $q_{14}$ | ic | $q_2$ |
| $q_2$ | ulo | $q_3$ |
| $q_3$ | u | $q_{11}$ |
| $q_{14}$ | ent | $q_{15}$ |
| $q_1$ | ica | $q_{12}$ |
| $q_{15}$ | ica | $q_{12}$ |
| START STATE | BLOCK | END STATE |

START TRANSITIONS (first two rows)

920 — MATCH TABLE (MT)

| $q_{11}$ | r | s | 3 |
|---|---|---|---|
| $q_{12}$ | auth | te | 2 |
| $q_{12}$ | id | l | 2 |
| $q_{14}$ | conf | ent | 1 |
| $q_{15}$ | conf | ial | 2 |
| STATE | HEAD | TAIL | DEPTH |

FIG. 10

| HEAD ($w$ bytes) | | | | TAIL ($w+k-2$ bytes) | | | |
|---|---|---|---|---|---|---|---|
| * | e | n | t | i | r | e | * |
| s | e | t | * | * | * | * | * |
| * | s | e | t | * | * | * | * |
| * | * | s | e | t | * | * | * |
| * | * | * | s | e | t | * | * |

← CORELESS PATTERN

} INDIVISIBLE PATTERN

USING TCAM FOR SHORT PATTERN LOOKUPS

VARIABLE-STRIDE STREAM SEGMENTATION AND MULTI-PATTERN MATCHING

BACKGROUND

1. Field of the Invention

The present invention relates to communication and computer networks, and, in particular, to use of variable-stride-block processing in multi-pattern matching for content-inspection system applications.

2. Description of the Related Art

This section introduces aspects that may help facilitate a better understanding of the invention(s). Accordingly, the statements of this section are to be read in this light and are not to be understood as admissions about what is or is not in the prior art.

Multi-pattern matching is a key function used by content-inspection systems such as signature-based network-intrusion detection and prevention systems (NIDS/NIPS or NIDPS). Such systems depend on reliable real-time detection of specific signatures or patterns within network traffic to determine whether the traffic may potentially be harmful to the network or components of the network, including hosts.

Typically, content-inspection systems may search for many such signatures concurrently. As line rates increase beyond 10 Gbps, methods for efficiently handling multi-pattern matching have become increasingly important.

Historically, pattern matching has been accomplished using a deterministic finite automaton (DFA). A DFA is a finite state machine where, for each state and input symbol, there is one and only one transition to a next state. Information on DFAs may be found in Gill, A., *Introduction to the Theory of Finite-State Machines*, McGraw-Hill, 1962, incorporated herein by reference in its entirety.

In a basic type of DFA-based pattern matching, network traffic streams are processed one byte or character at a time. Such DFAs require n states to process n single-byte patterns and require t transitions per state, where t is the number of symbols in the pattern alphabet. However, processing one byte per clock at the line rates of modern networks is too slow.

One way of improving upon the throughput of the fundamental DFA is by scanning multiple bytes (i.e., a block) of the input data stream in each matching step. While this block-oriented DFA approach provides a speedup relative to the byte-oriented DFA proportional to the number of bytes in a block, it presents other issues. In particular, since a pattern may start or end at any offset in a block, a block-oriented DFA may need either to (1) be repeated s times, where s is the block size or "stride" of the DFA, or (2) provide many more transitions per state.

For example, in a first block-oriented DFA approach to pattern matching, patterns are divided into s-byte blocks, and the blocks are used to construct the DFA. This results in a DFA with fewer states and transitions than a corresponding byte-oriented DFA for the same pattern. However, s instances of the DFA need to run in parallel, each accepting the same input data stream with an one-byte offset (to ensure that no patterns are overlooked). If the input stream is . . . babbaba . . . , the sequence . . . |ba|bb|ab|a . . . and its one-byte shifted version . . . b|ab|ba|ba| . . . both need to be processed to ensure that a match is not missed. With this approach, higher throughputs are achieved at the expense of higher memory-bandwidth usage (the result of running s instances of the matching engine in parallel), which memory-bandwidth needs grow in proportion to the block size s.

Alternatively, one can build a single DFA for which the transitions account for all the possible s-byte patterns that can occur in the stream. By using a larger DFA, a single instance of the matching engine can be used to scan the input data stream without the possibility of missed matches. The throughput gain in this case is at the cost of higher memory usage, rather than higher memory bandwidth. Note also that the number of transitions from any state can be as large as $t^s$, where t is the size of the alphabet. Indeed, for NIDS signature sets that use the English alphabet where t=26, memory usage becomes prohibitively high even for a block size s of two bytes.

Thus, a fundamental problem with existing pattern-matching approaches is excessive memory or memory-bandwidth requirements, particularly for systems that can run at the line-rate of current and anticipated network interfaces.

SUMMARY

In one embodiment, the present invention is a machine-implemented method for matching an input symbol stream to a symbol pattern. The input symbol stream is segmented into variable-size blocks of symbols to yield at least two input-stream segments of different lengths. Each of the at least two input-stream segments is compared with a pattern segment of the symbol pattern, wherein the pattern segment has fewer symbols than the symbol pattern.

In another embodiment, the present invention is a machine-implemented method for segmenting an input symbol stream. k-grams of symbols within the input symbol stream are formed, where (k>0). A value is calculated for each k-gram. One or more special values are identified from the k-gram values within a sliding window of length w, where (k<w). The input symbol stream is delimited into segments based on location of the one or more special values within the input symbol stream, where at least two segments are of different length.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 9 illustrates exemplary state transition and matching tables supporting the exemplary state transition graph of FIG. 7 according to various embodiments of the present invention.

FIG. 10 illustrates an exemplary TCAM storage table for coreless and indivisible patterns according to various embodiments of the present invention.

DETAILED DESCRIPTION

Figure 1:
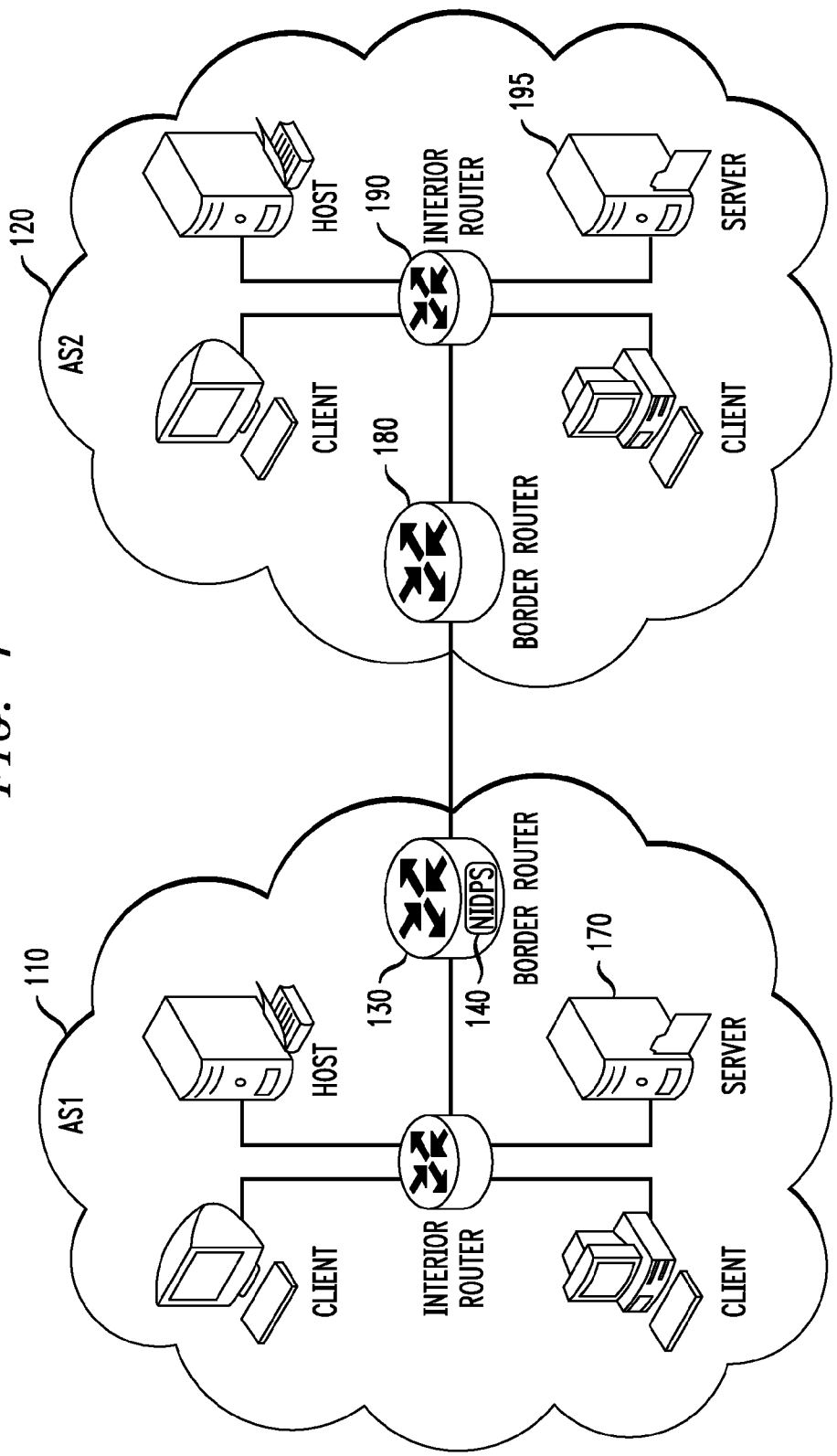
FIG. 1 is a block diagram of a communication network that spans at least two autonomous systems and includes a network-intrusion detection and prevention system according to various embodiments of the present invention.

FIG. 1 illustrates two autonomous systems 110 and 120 that may share traffic flows. Autonomous system 110 represents a private, corporate, or access network, and autonomous system 120 represents a different private, corporate, access network, or the Internet. Each autonomous system includes various clients, hosts, servers, and routers.

Autonomous system 110, in particular, includes border router 130. Border router 130 routes most if not all of the traffic that flows into and out of autonomous system 110 and has the ability to block specific traffic flows. Border router 130 includes network-intrusion detection and prevention system (NIDPS) 140. NIDPS system 140 serves to monitor traffic flowing through border router 130 and indicate to border router 130 which traffic flows may contain suspicious or malicious data. For example, server 195 in autonomous system 120 may be sending streams containing viruses or other malicious code and/or data to one or more client or host devices in autonomous system 110. Patterns associated with the malicious codes and/or data may be detected by NIDPS system 140. NIDPS system 140 will either block these codes and/or data directly or alert border router 130 to the malicious flows, in which case, border router 130 may block the flows, by dropping the offending packets or by blocking flows by IP source address, etc. Although NIDPS system 140 is shown as part of border router 130, NIDPS system 140 may also be a separate network device working in conjunction with a router or implemented as part of a proxy or gateway server. Other instances of a NIDPS system according to the present invention may also be present on other routers or network devices, including, for example, interior router 190, border router 180, or server 170.

Figure 2:
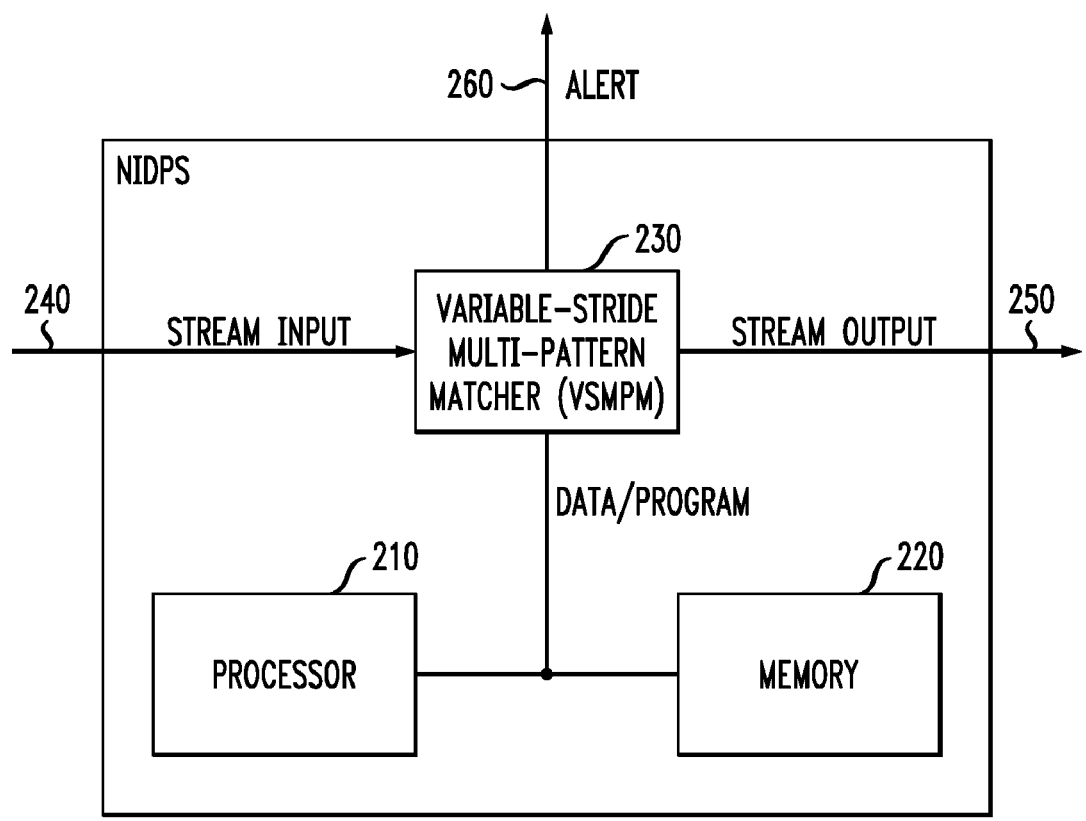
FIG. 2 is a block diagram of network-intrusion detection and prevention system 140 of FIG. 1.

FIG. 2 illustrates network-intrusion detection and prevention system 140 of FIG. 1, according to one embodiment of the present invention. NIDPS system 140 includes processor 210, memory 220, and variable-stride multi-pattern matching (VSMPM) system 230. VSMPM system 230 receives network traffic from border router 130 for inspection and detection via stream input 240 and optionally transmits the original traffic or a sanitized subset of the traffic back to border router 130 via stream output 250. VSMPM system 230 also outputs malicious-pattern detection alert 260 to border router 130. This alert informs border router 130 that the provided traffic includes one or more malicious or anomalous patterns. In various embodiments, stream input 240 will include data that has been pre-processed external to VSMPM system 230 to remove headers, encryption, and other information that may be irrelevant to the task of detection of malicious patterns in the traffic flows. Such pre-processing may include protocol analysis, protocol wrapper stripping, and/or payload reassembly. Various alternative arrangements may be used as would be understood to one skilled in the art.

As previously discussed, many of the problems associated with block-oriented DFAs of the prior art stem from the fact that the location of a potential block pattern to be matched is not known within an input stream. The block pattern to be matched may need to be compared with each block of similar length within the input stream resulting in considerable processing, memory, and/or memory-bandwidth penalty. However, pattern-matching complexity may be greatly reduced if the input stream can be segmented into blocks that correspond with the patterns to be matched when those patterns are present in the input stream. For example, consider the problem of finding a match for the word "over" in the text string " . . . ckbrownfoxjumpedoverth . . . " Although the human visual system may easily detect the presence of the familiar pattern "over" near the end of the string, the same task is more difficult for a machine. In particular, a traditional block-oriented DFA would first have to compare the pattern "over" with "ckbr," then with "kbro," then with "brow," and so on, successively shifting the input stream by one byte until the 4-byte string "over" from the input stream was compared against the template and a match was found.

It can be appreciated that, if somehow the input stream were first appropriately segmented, the complexity of the problem could be reduced. For example, if the input stream " . . . ckbrowfoxjumpedoverth . . . " was first segmented into " . . . ck|brown|fox|jumped|over|th . . . " then a couple of different approaches to matching could be taken. For example, in one approach, to determine if the pattern "over" occurred in the stream, one could first determine if any segments of length 4 existed in the string and, if so, then compare only those strings with the pattern to be matched. Alternatively, an n-byte pattern may be compared on a block basis with the first n bytes of each segment of the input stream independent of the segment's length. For example, "over" could be compared to "brown," "fox," "jumped," and finally "over" in succession until a match was found. This would be simpler than comparing "over" with every block of size 4 that is derived by shifting the input stream by 1 character for each comparison.

Thus, in embodiments of the present invention, input streams might not be processed in a byte-by-byte manner, but instead may be processed in larger natural units delimited from each other by a segmentation process that is positionally independent and unique. In embodiments of the present invention, input streams and patterns to be matched are uniquely and unambiguously segmented into variable-size multi-byte blocks. Pattern matching is then performed using block-oriented DFAs that use these variable-size blocks (or atomic units) as a new alphabet of symbols for state transitions. A greater-than-one average byte size for these atomic units results in considerable gains in pattern-matching speeds. This method also reduces the number of DFA states and state transitions, since each state transition now spans more than one byte. This approach is described with reference to FIG. 3 below.

Figure 3:
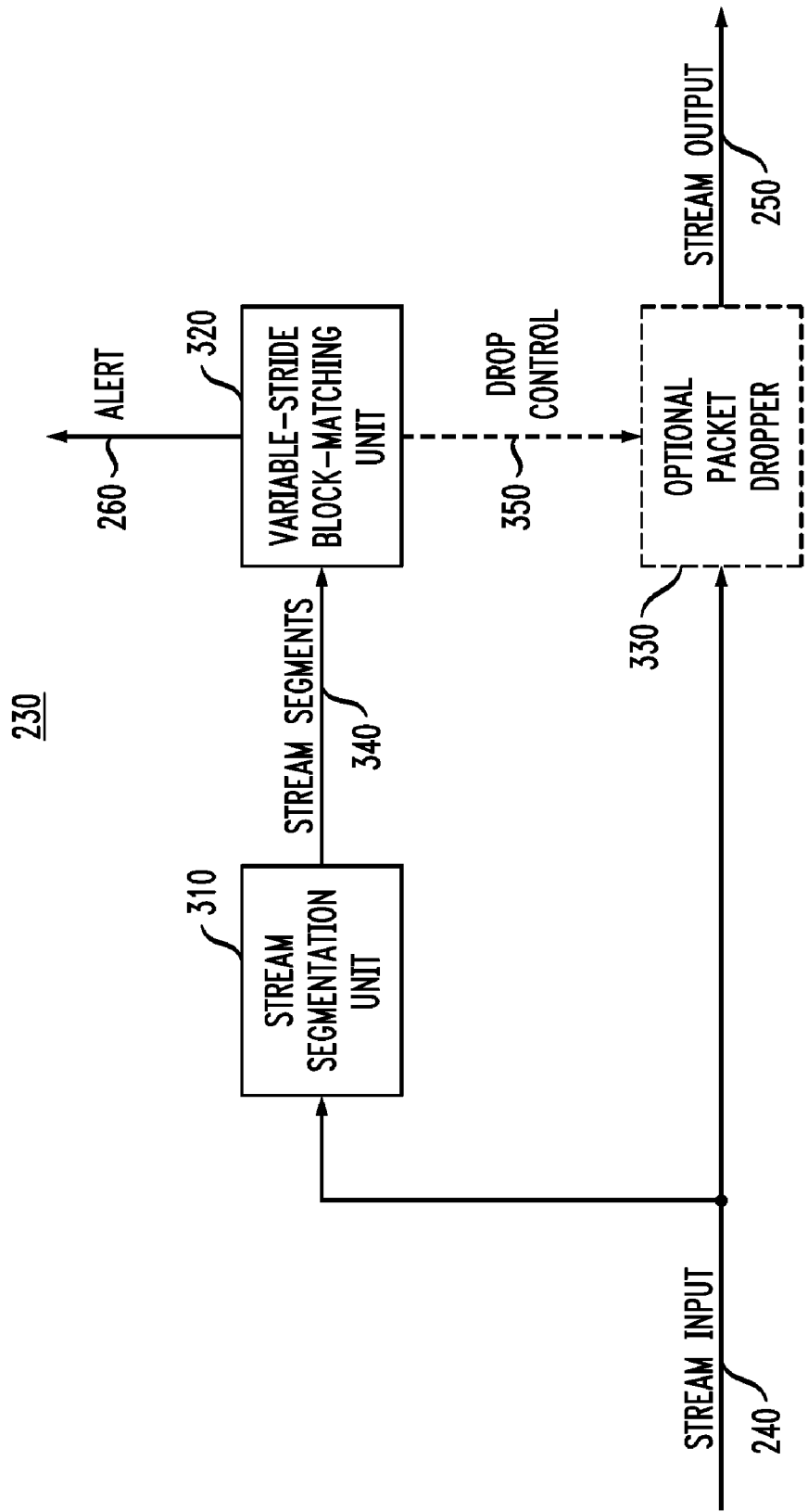
FIG. 3 is a block diagram of variable-stride multi-pattern matching (VSMPM) system 230 of FIG. 2.

FIG. 3 illustrates variable-stride multi-pattern matching system 230 of FIG. 2 according to various embodiments of the present invention. VSMPM system 230 includes stream segmentation unit 310, variable-stride block matching unit 320, and optional packet dropper 330. In operation, stream segmentation unit 310 receives input data from stream input 240, segments the stream into segments, and outputs stream segments 340 to variable-stride block-matching unit 320. Variable-stride block-matching unit 320 compares the segments against an alphabet of multiple-byte atomic symbols comprised of segments derived from the patterns to be matched and determines, using DFAs based upon these multiple-byte atomic symbols, whether particular patterns exist in the input stream. If a malicious pattern is detected in the input stream, then variable-stride block-matching unit 320 outputs alert 260, indicating to an external unit that the corresponding traffic is suspicious and/or malicious and/or must be blocked or dropped. Optionally, in some embodiments of VSMPM system 230, variable-stride block-matching unit 320 may alternatively output drop control signal 350 to an optional packet dropper unit that serves to remove malicious content from the input stream before passing the input stream along to stream output 250. In some implementations, no stream output is provided from VSMPM system 230. Although only a single variable-stride block-matching unit is shown in FIG. 3 for clarity, as may be appreciated by one skilled in the art, multiple parallel instances may be provided to support multiple pattern matching. Alternatively, in some embodiments of the present invention, variable-stride block matching unit 320 of FIG. 3 supports matching of multiple patterns concurrently.

In one embodiment, the present invention is a method of uniquely and unambiguously segmenting arbitrary streams of data. Variable-size block DFAs are used for pattern matching and ambiguity resolution. The combination of this segmentation and variable-block size DFA processing is applied to the pattern matching problem. As can be appreciated by one skilled in the art, a wide variety of segmentation techniques may be utilized for the present invention. Without loss of generality, one exemplary method is described in the following.

Segmentation

The segmentation scheme utilized in embodiments of the present invention is based on a popular document fingerprinting algorithm known as the "winnowing" algorithm. More information on the winnowing algorithm can be found in S. Schleimer, et al., "Winnowing: Local Algorithms for Document Fingerprinting," ACM SIGMOD 2003, the contents of which are incorporated herein by reference in their entirety. Other fingerprinting schemes may alternatively be used but the winnowing scheme has certain properties that are particularly desirable for the present application.

Because the winnowing algorithm was proposed for a different application, the algorithm is modified for the present pattern and data-stream block-generation invention. A nice feature of the winnowing algorithm is position independence. This ensures that adding some new text to a file will still result in all the original matches between two files being preserved. The algorithm works as follows. First, calculate the hash value of every block of s consecutive characters. Note that in the winnowing paper, these blocks of are termed "k-grams" where k=s. A stream of r characters generates (r−s+1) hash values. Second, use a sliding window of size w to locate the minimum hash value in the window. A tie is broken by selecting the rightmost minimum value. While these selected hash values are used as the fingerprint of a data stream in the winnowing scheme, in the present invention, they are used to identify delimiters to segments of the input data stream as well as delimiters to segments of patterns to be matched.

Figure 4:
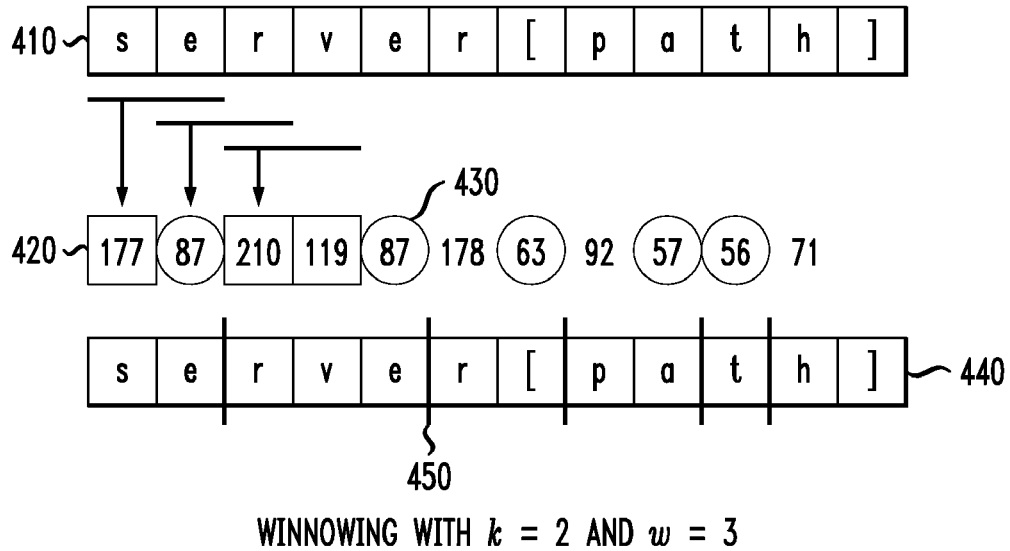
FIG. 4 is an example of the segmentation process of the present invention based on a modified winnowing process.

FIG. 4 illustrates a segmentation example 400 where the hash values are in the range 0 to 255. Note that the block size or stride s is bounded by the size of the sliding window w=3. FIG. 4 includes (i) input stream 410, (ii) k=2-byte block hashes such as block hash 420 and block hash 430, (iii) selected block hashes, such as block hash 430, and (iv) segmented output stream 440. In operation, hashes are computed for every consecutive k-byte block in the input stream, and the lowest block hash value in a w-byte window is identified as a special hash value. In the winnowing algorithm, these special hash values are chosen to represent a relatively evenly distributed subset of hash values to be used for document fingerprinting purposes. In the present invention, these special hash values are used to delimit the segments of data to be matched. Delimiter 450, for example, separates the byte string "rve" from the byte string "r[". The result of the application of the k=2-byte hashing and the selection of the minimum hash value in the w=3 window, is the segmented output stream 440 with segments of 2 or 3 bytes in length.

For use in pattern matching, the winnowing algorithm is modified in several ways. Because malicious patterns can be short, the block size s (bounded by w) is kept relatively small in order to get a meaningful number of blocks from a pattern. In various embodiments, a pattern is segmented into at least three blocks. k and w therefore are also small (on the order of a third of the length of the patterns to be matched). On the other hand, a larger block size s is better for the throughput, so it is desirable to make w as large as possible given the length of the patterns to be matched. As a tradeoff, in typical embodiments with patterns of interest on the order of 9 to 20 bytes, k is chosen to be either 1 or 2, and w may range from about 3 to about 8.

Because the hash window w is small, the stride s of the resulting segments (which are bounded by w) will also be small. Thus, the s-byte DFAs may be implemented with fast hardware, and fast hash functions that can but need not use the Rabin fast-hashing technique described in the aforementioned winnowing paper. Additionally, since a goal of the present invention is to segment an input data stream and patterns rather than to generate fingerprints to be used in matching, large hash values are not necessarily advantageous. Eight bits or even fewer may be sufficient. This is an advantage for efficient and fast hardware implementation. As shown in FIG. 4, the hash value of a hash window (e.g., hash value 420 corresponding to the 2-byte hash window associated with the characters "se") is less than 256. Note also that the delimiters are set to be after the minimum hash value that is selected (e.g., delimiter 450 is chosen to be after the hash value of 87, which is the lowest hash value in the window corresponding to the characters "rve"). This guarantees that the size of any block is never longer than w, when k<w+2.

The winnowing algorithm has a "self-synchronization" (i.e., context independence) property that is very useful for embodiments of the present invention in that irrespective of the context in which a pattern appears in the input stream, the input stream is always segmented into the same sequence of blocks (with some head and tail pattern exceptions that can be accommodated as will be described below). Thus, the result of the segmentation process of the present invention is the determination of unique segments within patterns that may be used as atomic units in the construction of a DFA for pattern matching.

Figure 5:
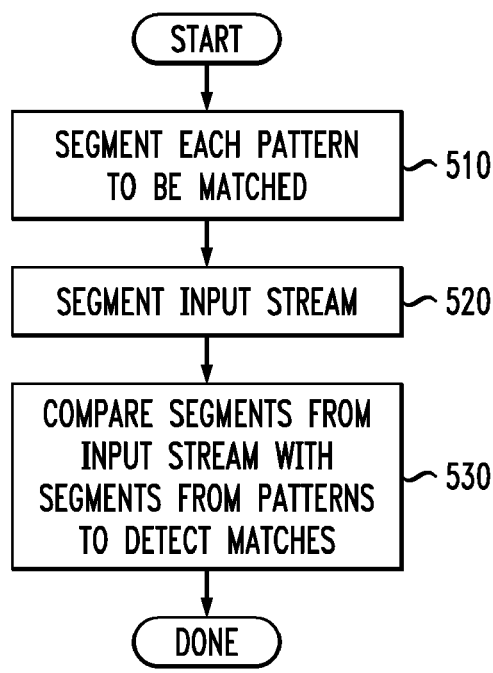
FIG. 5 is a flow diagram illustrating the top-level process associated with various embodiments of the present invention.

FIG. 5 shows high-level flow diagram 500 illustrating the segmentation and matching process according to various embodiments of the present invention. In step 510, as a preprocessing step, patterns that are of interest for later matching are first segmented into a sequence of blocks using the segmentation process according to the present invention. These segments may be stored for later use or may be used in the construction of a block-oriented DFA. In step 520, a like process of segmentation is applied to the input stream. Finally, in step 530, segments derived from the patterns to be matched are compared with segments derived from the input data stream to determine whether the patterns of interest are present in the input data stream. The comparison of step 530 may be done via a block-oriented DFA developed using the segments of the patterns to be matched, which segments were generated in step 510.

Figure 6:
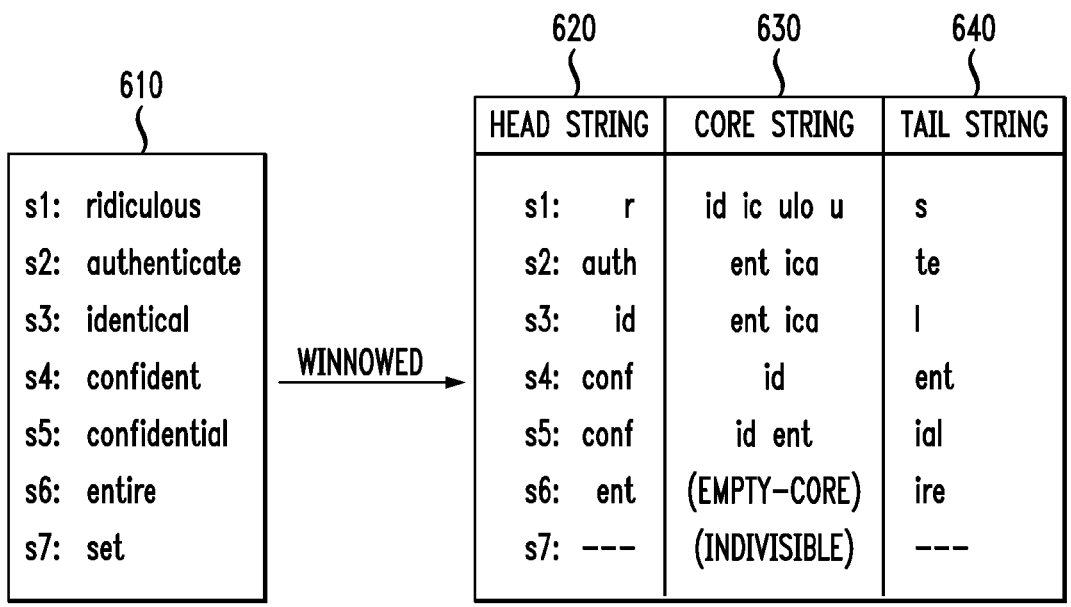
FIG. 6 illustrates an exemplary segmentation of various patterns according to various embodiments of the present invention.

During segmentation of patterns, multiple segments are typically produced, depending on the size of the pattern relative to the segmentation parameters k and w. The first segment is referred to as a "head" block, and the last segment is referred to as a "tail" block. All the other segments in between are referred to as "core" blocks. FIG. 6 illustrates an example of segmentation 600 of various patterns. Segmentation 600 includes patterns 610 that are to be segmented, and head segments 620, core segments 630, and tail segments 640 that result from the segmentation of the patterns. Note that the example illustrates the concepts using familiar character's and strings but that the invention treats these broadly as symbols and segments. Note also that some short patterns may have only one delimiter (i.e., there is no core segment and the pattern consists of only the head and tail segments) or no delimiter at all. These two types of patterns are called "coreless patterns" and "indivisible patterns," respectively. In FIG. 6, "entire" is a coreless pattern, and "se" is an indivisible pattern. The segmentation scheme of the present invention has the following properties:

Property 1: The size of any segment block is in the range [1, w]. Tail block sizes are in the range [k−1, w+k−2], indivisible pattern sizes are in the range [1, w+k−2], and coreless pattern sizes are in the range [w+k−1, 2w+k−2].

Property 2: If a pattern appears in a data stream then segmenting the data stream results in exactly the same delimiters as the core blocks of the pattern.

Note that the head and tail blocks of a pattern may have extra delimiters when they appear in a data stream, because the head block can be affected by the prefix, and the tail block can be affected by the suffix. However, the core blocks are totally confined to the pattern and isolated from the context. These unchanged core blocks can be used to narrow the search in pattern matching. This is illustrated by the following.

Suppose that pattern S2 of FIG. 6 appears in a data stream. Depending on the (w−1=3) characters that appear immediately before S2, the head block "auth" can possibly be segmented into "a|u|t|h", "au|th", and so on. Likewise, the segmentation of the tail block "te" is determined by the (w−1=3) characters that follow S2 in the data stream. However, it is guaranteed that there will be a delimiter after character "h", because all the characters that are needed to make the decision (i.e., a, u, t, and h) are part of the segmentation process. This is also true for the two delimiters that follow the pattern S2 in the stream, so the segmentation will always yield the two core blocks "ent" and "ica".

Since the core blocks of a pattern are invariant, they support fast pattern matching. However, more information than just that the two blocks "ent" and "ica" have been matched consecutively is needed to match the pattern S2 with certainty. What is known, if the two blocks "ent" and "ica" have been matched consecutively, is that there is potentially a match to S2. To verify the match, once the core blocks have been matched, the next step is to retrieve the w-byte prefix symbol and (w+k−2)-byte suffix symbol in the data stream to compare against S2's head block and tail block, respectively.

Variable-Stride Matching

Once the patterns have been segmented during a pre-processing step, and an input stream is similarly segmented, the next task involves comparing the input stream segments with the pre-determined pattern segments. In one embodiment of the present invention, a variable-stride discrete finite automaton (VS-DFA) is used for this purpose. For example, in FIG. 3, variable-stride block matching unit 320 may be implemented in the form of a VS-DFA as described in the following.

The VS-DFA construction follows the procedure in the Aho-Corasick DFA construction algorithm. More information about Aho-Corasick DFA construction can be found in A. V. Aho and M. J. Coraskic, "Efficient string matching: An aid to bibliographic search," Communications of the ACM, vol. 18, no. 6, 1975, the contents of which are incorporated herein in their entirety by reference.

The core blocks of patterns are extracted using the segmentation process and are used as alphabet symbols to build the DFA. Hence, one feature of the VS-DFA is that its state transitions are based on core blocks rather than individual characters. The core-block matches are followed by head- and tail-block matches. The construction of the DFA ensures that all core-block sequences can be detected with one state transition per block. Following this, "quasi-match" states, if hit, lead to a final verification step.

Figure 7:
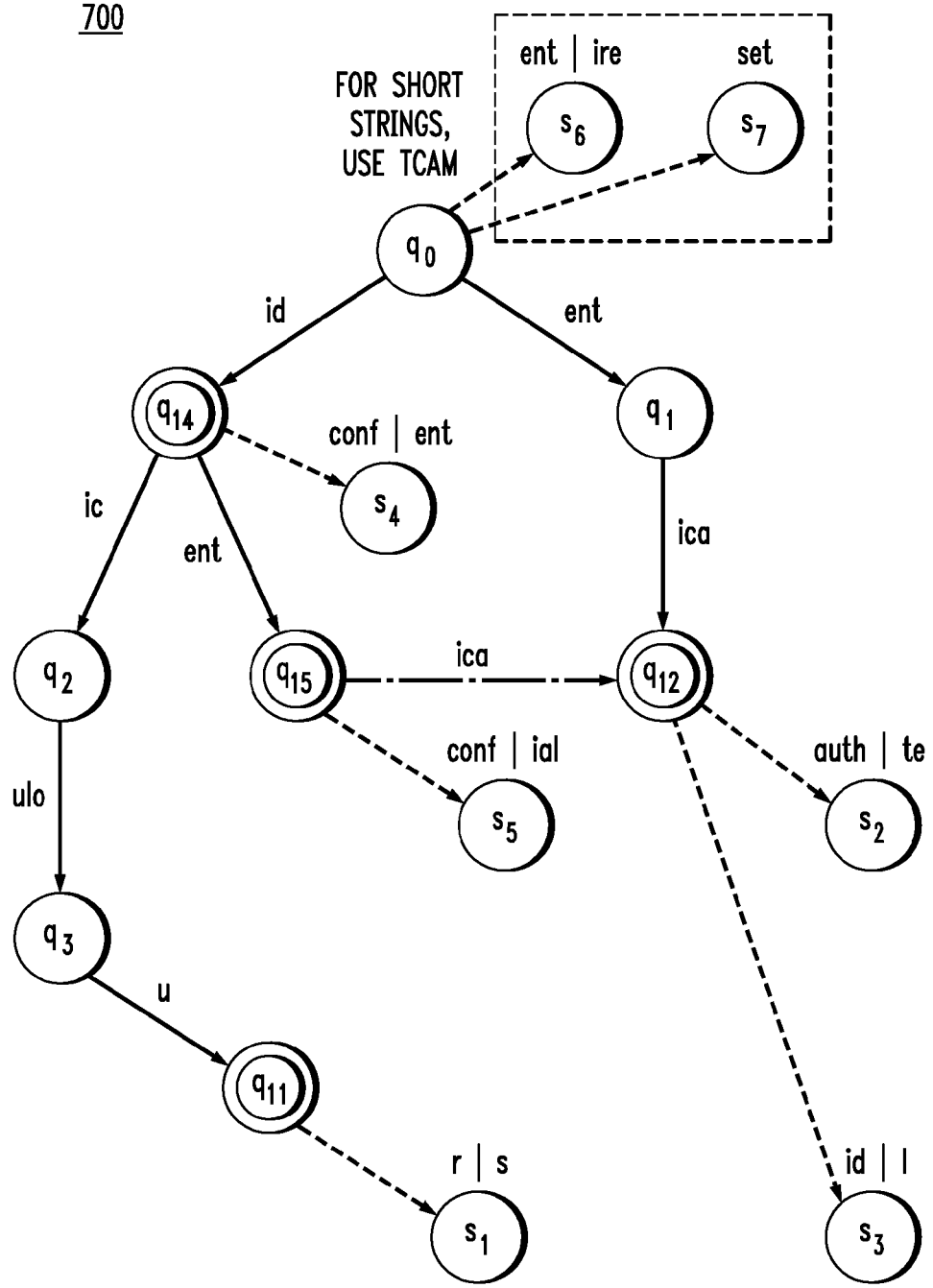
FIG. 7 illustrates an exemplary state transition graph for the patterns used in the example of FIG. 6 according to various embodiments of the present invention.

FIG. 7 illustrates exemplary state transition graph 700 for the patterns given in FIG. 6. The DFA contains seven states. q0 is the initial state. q11, q12, q14, and q15 are the quasi-match states. To avoid cluttering up the figure, the failure transitions that point back to the initial state are not shown. The correctness of the VS-DFA is guaranteed by the second property of the segmentation process, specifically, as long as a pattern appears in the data stream, its core blocks will also appear in the segmented data stream, and hence the constructed DFA would definitely capture the core blocks and then check the head and tail blocks. The approach to construction of the VS-DFA is similar to classic DFA construction to detect block symbol sequences. The primary difference is that some paths can be removed due to a priori knowledge.

The constructed DFA works as if the matching is started directly on the pattern body without knowledge of the head and tail blocks. However, when constructing the DFA, knowledge of the head and tail blocks is next used to remove unnecessary state transitions. In the classical DFA, if the path qi→qj consumes the same character string as the path q0→qk, all the transitions starting from qk need to be copied to qj, unless the transition has already been defined on some forwarding path. This is because, in this case, the string covered by the shorter path is the suffix of the string covered by the longer path, and the longer path can possibly lead to the matches to the same patterns as the shorter path does. The jump transitions are therefore constructed to resolve the overlapping between patterns. This is illustrated in FIG. 7 where a jump transition from q15 to q12 is used, because the core-block sequence "|id|ent|" overlaps with core-block sequence "|ent|ica|". However, in the VS-DFA, the transitions may only be copied when the head block on the path q0→qk matches the entry path of qi. In the example, the head blocks on the path q0→q12 include "id|" and "auth|". One of them matches the entry path of q1 (i.e. "id|"), hence the transition is needed. If the pattern "id|ent|ic|a|" is removed from the DFA, then the transition q15→q12 becomes unnecessary and can be safely removed.

As a special case of the above, in classical DFA construction, all transitions from q0 should be copied to all other states, unless the transition is defined on some forward path. These transitions are also known as restartable transitions. In the VS-DFA, the restartable transitions are generated only when necessary.

In a large VS-DFA, the number of restartable transitions is large and can increase memory needs. Fortunately, the total number of "start transitions" from q0 is small. In certain embodiments, the "start transitions" are stored in a separate on-chip "start table," which is searched in parallel with the VS-DFA. In these embodiments, all the restartable transitions can be removed. Further, if an outgoing transition from a state cannot be found, the search result from the start table is used to figure out another path.

System

From a hardware perspective, referring back to FIGS. 2 and 3, variable-stride multi-pattern matching system 230 includes a stream segmentation unit (e.g., stream segmentation unit 310) and a variable-stride block-matching unit (e.g., variable-stride block-matching unit 320). In various embodiments, stream segmentation unit 310 is implemented using a segmentation scheme based on modifications of the winnowing algorithm, and variable-stride block matching unit 320 is implemented using a specialized VS-DFA pattern matcher.

Figure 8:
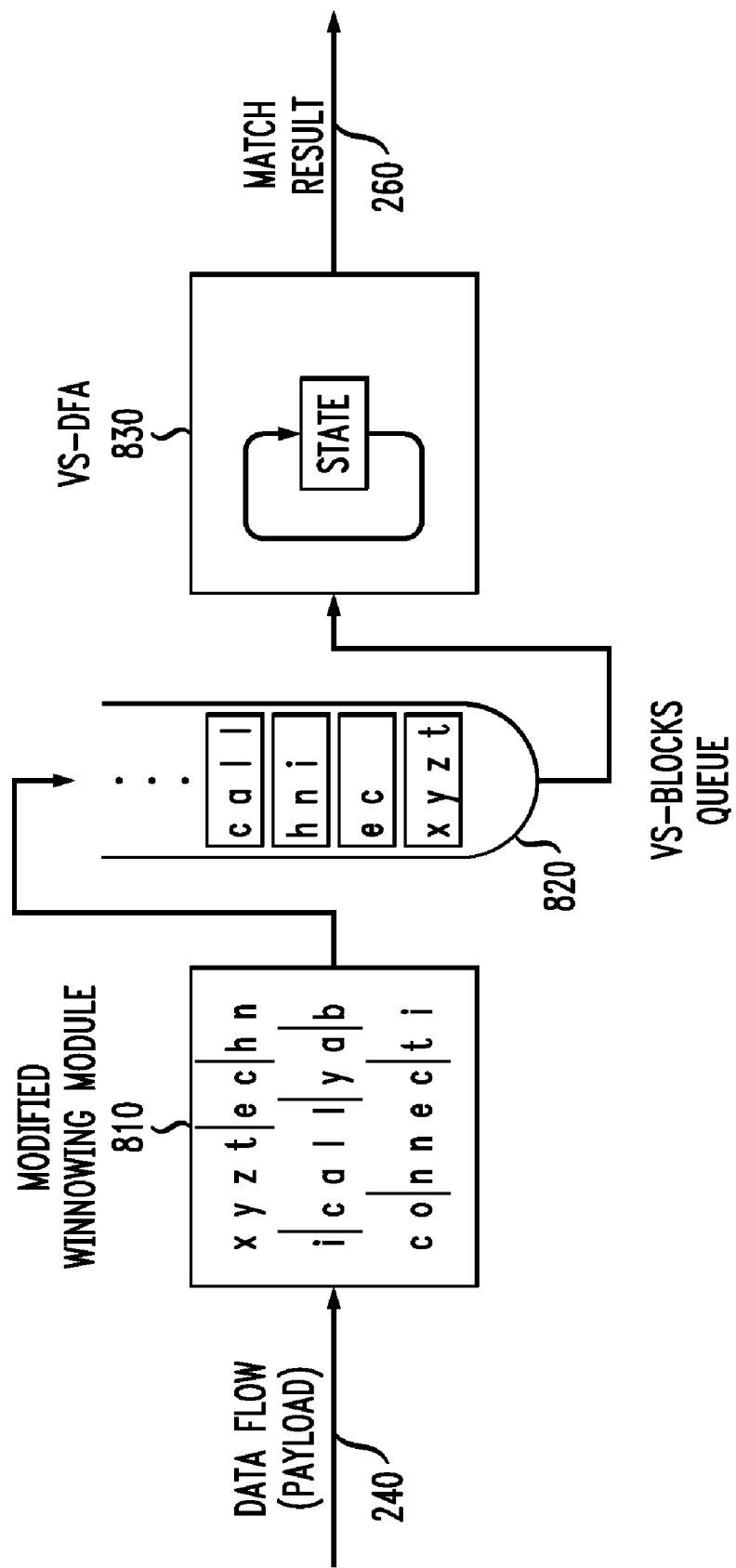
FIG. 8 illustrates VSMPM system 230 of FIG. 2 according to various embodiments of the present invention.

FIG. 8 illustrates VSMPM system 230 of FIG. 2 according to various embodiments of the present invention. VSMPM system 230 includes modified winnowing module 810, variable-stride blocks queue 820, and VS-DFA 830. In operation, incoming data stream (packet payload) 240 is first segmented into variable-sized blocks by modified winnowing module 810 and pushed into variable-stride blocks queue 820 (implemented using a first-in-first-out (FIFO) queue). Then the blocks are fetched from the queue and fed into variable-stride DFA 830 one by one. VS-DFA 830 processes the variable-stride blocks, first processing core blocks and then refining matches based on head and tail blocks. Assuming a match with a pattern of interest is found, "match found" alert 260 is output from VS-DFA 830.

The circuit for the modified winnowing module may be implemented to process more than w bytes per clock cycle. Since state machine 830 may consume fewer than w bytes per clock cycle, a FIFO queue is used between the two units to accommodate small short-term rate differences between them. In this implementation, the system throughput is determined by the state machine.

In various embodiments of state machine module 830, in addition to a start table as discussed earlier, two more tables are provided as support data structures: the state transition table and the match table. Examples of these are shown in FIG. 9.

FIG. 9 illustrates support tables 900 according to various embodiments of the present invention. Support tables 900 include state transition table (STT) 910 and match table (MT) 920. STT table 910 is essentially a hash table. The hash key is the combination of the start state and the input block. The hash value is the address of the next state. In each cycle, if the queried combination is found, then the end state stored in the corresponding row of STT table 910 is retrieved; otherwise, the next state is obtained from the start table.

Since the transition table is hash-table based, the allocation of state numbers (also the address) is generally arbitrary. However, for the quasi-match states, a specific range for them is pre-allocated. This is because it is desirable to directly calculate the corresponding entry's address in the matching table. For example, in match table 920, range q1* (where * represents any single digit) is pre-allocated for the matching states. State q1$i$ corresponds to the i-th MT entry. A special case is that q12 is associated with two possible head/tail pairs. Hence q12 is allocated two MT entries, and the state machine needs to check the entries linearly for possible matching. q13 is deliberately not allocated so that the third MT entry is reserved for q12.

To enable match verification on the quasi-match states, a head queue (HQ) may be maintained in certain embodiments. The head queue stores the block-matching history. The HQ is implemented using a circular buffer with D entries, where D is the length of the longest forward path of the VS-DFA. Because the exact length of a head block cannot be known in advance, the size of each queue entry is set to w bytes. If a block is shorter than w bytes, then the rest is padded. Hence, the HQ size is (D×w) bytes, which guarantees that enough history is held for future reference. The depth field in the MT determines which entry in the HQ is to be retrieved as the head. The depth field can be calculated by subtracting the current HQ index with the depth value.

Short-Pattern Handling

For patterns of length l>2w+k−2, it is guaranteed that there is at least one core block for DFA construction. However, when w+k−2<l<2w+k−1, the pattern becomes a coreless pattern which has only head and tail blocks. Patterns with length l<w+k−1 have no delimiter at all and become indivisible patterns. The VS-DFA is not used for these short patterns directly because of the lack of core blocks. Instead, in various embodiments of the present invention, these patterns may be handled efficiently by a small ternary content addressable memory (TCAM).

Ideally, the TCAM memory should have the same throughput as the state machine (i.e., one block per lookup cycle). To achieve this goal, a conventional method would duplicate the pattern multiple times, and shift each duplicate one byte with respect to the previous. However, the segmentation scheme of the present invention makes it sufficient to use only one TCAM entry for each coreless pattern. The TCAM entry is 2w+k−2 bytes in width. Each entry is partitioned into two sections, which are w bytes and w+k−2 bytes, respectively. To store a coreless pattern, its head block is aligned to the right of the first section and its tail block to the left of the second section. The unused bytes in the entry are masked as "don't care".

No such optimization is done for indivisible patterns. Instead, max{w, w+k−2} TCAM entries are used for each indivisible pattern. Each entry covers a possible shift where this pattern can appear in the data stream. The first entry is left aligned with the TCAM entry. Each following entry shifts one byte toward the right side. An example is shown in FIG. 10. In this example, since w=4 and k=2, the TCAM entry is 8-bytes wide. The coreless pattern "entire" segmented into "ent|ire", is stored in TCAM entry 1 as shown. The indivisible pattern "set" is spread across 4 TCAM entries.

With this arrangement, to perform matches, the input stream is segmented as discussed earlier. One extra delimiter is added at the end of the byte stream. At each delimiter in the byte stream, w bytes are extracted before the delimiter, and (w+k−2) bytes are extracted after it. The combined string is then used as a key to query the TCAM memory. This approach is guaranteed to find the correct match for any short pattern. Short patterns, fortunately, are typically only a small fraction of the pattern set.

Reducing Single-Byte Blocks

VS-DFA's advantage in throughput is due to the relatively large average stride per DFA traversal step. For a random data stream, the expected block size is (w+1)/2. However, certain input data streams processed by the segmentation algorithm as previously described may result in single-byte segments being produced independent of the chosen hash functions and window parameters. For example, processing an input stream with the same single character repeated consecutively may result in a series of single-byte segments. This may reduce system throughput and also make the system vulnerable to particular types of Denial-of-Service (DoS) attack.

A low-entropy data stream may also be problematic for the previously described segmentation algorithm. Thus, in various embodiments of the present invention, an improvement over the hash value tie-breaker method is used to alleviate the problem of single-byte blocks appearing in segment streams and reducing effective system throughput. This is done by the application of one or two additional segment-combining rules. The resulting enhanced segmentation process is used in various embodiments of the present invention:

Combination Rule 1 (applied to segment streams): If more than one consecutive single-byte blocks appear in a data stream, then, starting with the first block, combine w single-byte blocks to form a new consolidated w-byte block. The remaining blocks, if more than one, are also combined. For example, suppose w=4, and the consecutive single-byte blocks are |c1|c2|c3|c4|c5|c6| (assume the block before c1 and the block after c6 are longer than one byte). Applying the rule results in two combined blocks |c1c2c3c4|c5c6|.

Combination rule 1 eliminates all consecutive single-byte blocks, leaving only some isolated single-byte blocks dispersed between multi-byte blocks. In the worst case, where the single-byte blocks and double-byte blocks interleave with each other in a data stream, combination rule 1 provides a speedup factor of 1.5. A similar combination is also performed on the patterns. However, blindly combining the single-byte blocks in patterns may cause the segmentations on streams and patterns to lose their synchronization. The ambiguity occurs when the first or the last of several core blocks are single-byte blocks. Given different contexts (e.g., different prefix and suffix bytes), combination rule 1 may lead to different results. Thus, to ensure algorithm correctness, if the first one or more original core blocks are single-byte blocks, then they are no longer regarded as core blocks. Instead, they are pushed out as part of the head block. Likewise, special handling is also needed for the single-byte blocks neighboring the tail.

Combination Rule 1 (applied to patterns): Combine all consecutive single-byte core blocks right after the original head block into the new head block. Combine the rest of the core blocks in the same way as described in combination rule 1 (applied on segment streams). After the combination, if the last core block is a combined one and it is shorter than w bytes, then combine it into the tail block. The following example illustrates combination rule 1 (applied to patterns).

Assume pattern aaaaacbdddddabc is originally segmented as aaa|a|a|a|cbd|d|d|d|d|d|abc with w=3. The first two single-byte blocks |a|a| should be combined with the head block. For the remaining blocks, the first three consecutive |d|s are combined into |ddd| and the last two consecutive |d|s are combined into |dd|. Since the block |dd|'s length is shorter than 3, it is combined with the tail block.

Hence the new segmentation after applying the rule becomes aaaaa|cbd|ddd|ddabc. If, in another case, the same pattern is originally segmented differently as aaa|a|a|a|cbd|d|d|d|d|d|ab|c. After applying combination rule 1, the new segmentation should be aaaaa|cbd|ddd|dd|ab|c. The tail block remains the same because the last core block |ab| is not a result of combination.

Combination rule 1 improves both the worst-case and the expected throughput. The downside of the combination is that patterns may have longer head and tail blocks. Moreover, some patterns may even become coreless patterns if all their core blocks are single-byte blocks before applying the rule. After the combination, the maximum tail block size can be (w+k−2)+(w−1)=(2w+k−3) bytes, since at most (w−1) single-byte blocks can be merged into the tail block. As for the head block, there is now no upper bound on the size.

Since the algorithm needs to buffer the potential head blocks from the data stream for later matching verification, the size of the head blocks must be constrained. Fortunately, the number of patterns with their head blocks longer than w bytes is small. The issue is resolved by replicating the pattern w times. Each replicated pattern is given a unique segmentation on the head block. The head-block segmentation procedure is as follows:

Set the first delimiter after the ith byte, where ($1 \leq i \leq w$). After the first delimiter, a new delimiter is set after every w bytes. When the segmentation is done, the first block is kept as the new head block, and all the others are promoted to be core blocks. Each replicated pattern is then programmed in the VS-DFA as a new pattern, even though they still lead to matching the same stream segment pattern occurrence.

For example, suppose the pattern c1c2c3c4c5c6c7c8c9c10c11 is initially segmented as c1|c2|c3|c4|c5|c6|c7|c8c9c10|c11 with w=3. After applying combination rule 1, the segmented pattern becomes |c1c2c3c4c5c6c7|c8c9c10|c11. The new head block is even longer than 2w bytes. To constrain the length of the head block, the pattern is replicated three times and each receives a new segmentation as follows:

|c1c2c3c4|c5c6c7|c8c9c10|c11,
|c1c2c3c4c5|c6c7|c8c9c10|c11, and
|c1c2c3c4c5c6|c7|c8c9c10|c11.

Now no matter in which context the pattern appears in the input stream, it is guaranteed to be caught by one of the w segmentations.

In summary, for patterns that have big head blocks after applying combination rule 1, the head block is constrained to be within 2w bytes at the cost of replicating the pattern w times. In some embodiments, the maximum head block size may be further constrained at the cost or using additional replicated patterns in that DFA.

Eliminating Single-Byte Blocks

Combination rule 1 eliminates all the consecutive single-byte blocks. However, the remaining isolated single-byte blocks may still slow down the processing. The worst-case throughput is 1.5 characters per step. Another rule, combination rule 2, may be used in various embodiments of the enhanced segmentation approach to eliminate almost all single-byte blocks.

Combination Rule 2: After applying combination rule 1, combine every remaining single-byte block into its preceding block. For patterns, this only applies to core blocks. Also, since the first byte of the tail block might become a single-byte block in a data stream, replicate the pattern once and make a new segmentation to cover this case. For example, the pattern:

|c1c2c3|c4c5|c6|c7c8|c9c10c11, becomes
|c1c2c3|c4c5c6|c7c8|c9c10c11
after the application of combination rule 2.

However, in a data stream, the tail block of the pattern might be segmented as |c9|c10c11, so combination rule 2, when applied to the data stream, may also result in the segmentation |c1c2c3|c4c5c6|c7c8c9|c10c11. Hence, both pattern segmentations should be inserted into the VS-DFA.

However, in some cases, this replication is not necessary. For example, for the above pattern, if k=2 then the winnowing hash value is calculated at the position of c9 and c10. If the first value is greater than the second, then there will be certainly no delimiter between i and j, regardless of what characters appear after the pattern. In this case, no replication is done. Combination rule 2 prevents the DoS-attack problem and potentially increases system throughput. It also has other impacts on the system. The maximum block size now becomes (w+1) bytes. The patterns with long head blocks after applying combination rule 1 should be replicated (w+1) times accordingly. Although the combination rules may lead to some pattern replications, they do not necessarily increase memory consumption of the VS-DFA. On the contrary, they may actually help to lower memory consumption since single-byte state transitions are avoided.

Figure 11:
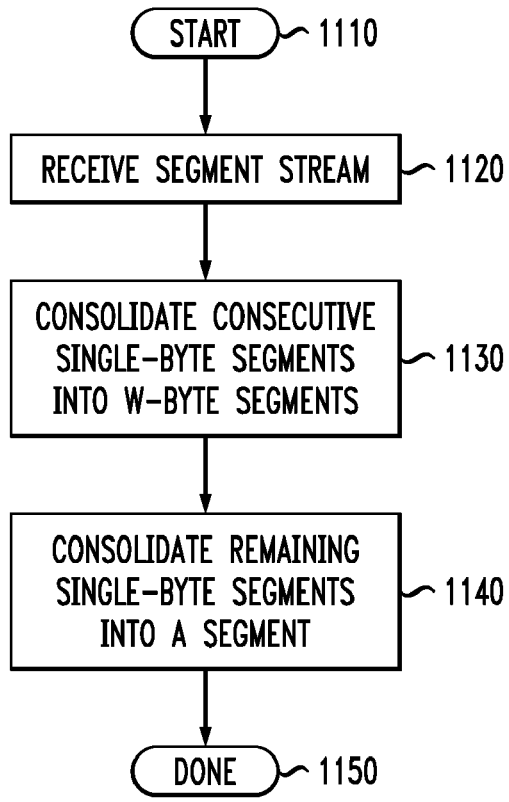
FIG. 11 illustrates exemplary flow diagrams (a) and (b) corresponding to two rules for input stream segments according to various embodiments of the present invention.
Figure 11:
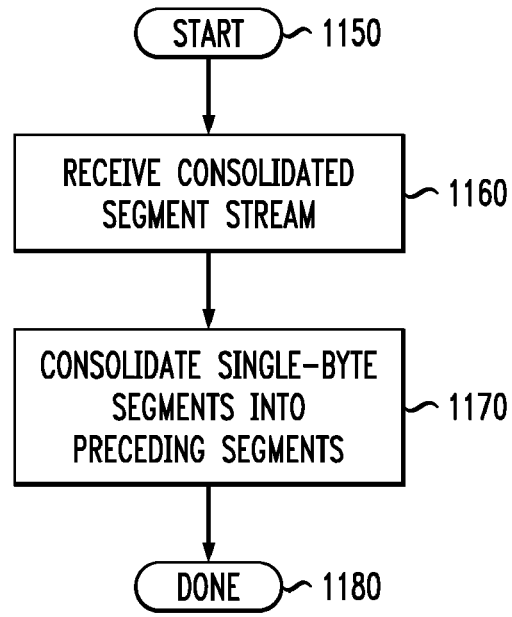

The combination rules as applied to input data segment streams to produce enhanced segment streams is illustrated in FIG. 11. Here FIG. 11(a) illustrates combination rule 1 applied to input data segment streams that resulted from the application of the non-enhanced segmentation process. The process starts in step 1110. In step 1120, a series of segments are received from a portion of the system responsible for preliminary segmentation of the input data stream. In step 1130, consecutive single-byte segments (blocks) are consolidated into w-byte segments, and in step 1140, each remaining set of consecutive single-byte segments is also combined into a single segment. What remains are orphan single-byte segments, separated from each other by at least one multi-byte segment. The process ends in step 1150.

In FIG. 11(b), combination rule 2 is applied to the stream that results from the process of FIG. 11(a). In particular, the process starts in step 1150, and in step 1160, the stream that results from the application of combination rule 1 is received. In step 1170, every stray single-byte segment is consolidated into its preceding multi-byte segment. The process ends in step 1180.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Alternatively or additionally, the invention or parts of the invention can be implemented in various forms, including without limitation, an application specific integrated circuit (ASIC) or field programmable gate array (FPGA). All of the aforementioned embodiments, whether processor, processor with software, ASIC, FPGA, stand-alone logic, or electronic or optical circuit should be understood herein to fall within the scope of the claims terminology of a "machine," and "machine-implemented" should be understood to include, without limitation, any of the aforementioned implementations as well as other implementation technologies that would be understood to be equivalent to those technologies by one skilled in the art.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Although many of the examples in the foregoing discussion utilized English-language words and characters, an advantage of the segmentation scheme of the present invention is that it may be applied to any arbitrary input byte streams and/or byte patterns. Thus, the present scheme does not rely on semantic context of a stream to support segmentation. For example, while punctuation, whitespace, capitalization and/or other context elements that may be found in an English-language document may be used to delimit boundaries between multi-byte character strings found in such documents, the present invention does not require any such context-dependent system and thus has applicability to any arbitrary byte stream.

Additionally, although the present invention is described in the context of data streams comprised of bytes of data, it is not restricted to octets of binary data. By way of example, if, instead of eight-bit representations of data, in an alternative representation of data, ten, twelve, or any other number of bits were used to represent symbols, then this invention would be equally applicable to the alternative representation. Thus, it is appropriate to say the present invention applies generally to any arbitrary input "symbol" streams. Further, in the same way, it is not necessary for these symbols to be specifically 8-bits in length, it is also not necessary that these symbols be restricted to a base two representation.

Many of the foregoing embodiments have been illustrated using an exemplary winnowing function that incorporates a hash function and a minimum value filter to select special hash values from k-grams within the input symbol stream. A hash function itself is an example of a class of functions known as one-way functions and the minimum value filter is an example of a class of filters or criteria that may be applied to a series of numbers to differentiate one from a set. In general, the present invention should not be limited by the examples of the embodiments but retain the full scope of the claims recited below as would be understood to one skilled in the art.

We claim:

1. A machine-implemented method for identifying multiple instances of a symbol pattern in a data packet being transmitted over a communication network, the method comprising:

(a) the machine segmenting the data packet into variable-size blocks of symbols using variable stride segmentation to yield a plurality of data-packet segments having two or more different lengths, wherein the data packet is delimited into the plurality of data-packet segments by (i) applying a hash function to different k-grams of symbols within the data packet to generate hash values associated with the different k-grams and (ii) delimiting each data-packet segment based on one or more of the hash values; and (b) the machine comparing each of the plurality of data-packet segments with a pattern segment of the symbol pattern using deterministic finite automaton (DFA) processing to identify the multiple instances of the symbol pattern in the data packet with no false positives and no false negatives, wherein the pattern segment has fewer symbols than the symbol pattern.

2. The method of claim 1, wherein step (a) comprises:
(a1) performing a hash function on the k-grams of symbols within the data packet to produce the hash values associated with the k-grams, where (k>0);
(a2) filtering the values to identify at least one special hash value associated with at least one k-gram; and
(a3) delimiting the data-packet stream into at least two data-packet segments based on location within the data packet of the at least one k-gram associated with the at least one special hash value.

3. The method of claim 2, wherein:
step (a1) comprises generating a plurality of hash values corresponding to a plurality of k-grams within a window of size w, where (k<w); and
step (a2) comprises selecting the at least one special hash value associated with the at least one k-gram as the minimum hash value within the window.

4. The method of claim 1, wherein step (a) further comprises segmenting said symbol pattern into at least a head block, a core block, and a tail block, wherein said pattern segment corresponds to one of the head block, the core block, and the tail block.

5. The method of claim 1, wherein step (b) is performed using a single variable-stride discrete finite automaton (VS-DFA).

6. The method of claim 5, wherein the VS-DFA is constructed using an alphabet comprising at least two core blocks.

7. The method of claim 5, wherein the VS-DFA includes a quasi-state corresponding to one of at least two different possible pattern matches, wherein determining a pattern match among the at least two different possible pattern matches is a function of head and tail blocks.

8. The method of claim 5, wherein:
said symbol pattern corresponds to a first symbol sequence; and
the VS-DFA is constructed using an alphabet that includes at least the pattern segment and a segment of a second symbol pattern corresponding to a second symbol sequence, the second symbol sequence being different from the first symbol sequence.

9. The method of claim 1, further comprising:
(c) consolidating at least one sequence of p consecutive single-symbol data-packet segments into a single p-symbol data-packet segment, where (p>1).

10. The method of claim 1, further comprising:
(c) consolidating at least one single-symbol data-packet segment into an adjacent multi-symbol data-packet segment.

11. Apparatus for identifying multiple instances of a symbol pattern in a data packet being transmitted over a communication network, apparatus configured to:
(a) segment the data packet into variable-size blocks of symbols using variable stride segmentation to yield a plurality of data-packet segments having two or more different lengths, wherein the data packet is delimited into the plurality of data-packet segments by (i) applying a hash function to different k-grams of symbols within the data packet to generate hash values associated with the different k-grams and (ii) delimiting each data-packet segment based on one or more of the hash values; and (b) compare each of the plurality of data-packet segments with a pattern segment of the symbol pattern using deterministic finite automaton (DFA) processing to identify the multiple instances of the symbol pattern in the data packet with no false positives and no false negatives, wherein the pattern segment has fewer symbols than the symbol pattern.

12. The apparatus of claim 11, wherein the apparatus is configured to segment the data packet by:
(a1) performing a hash function on the k-grams of symbols within the data packet to produce the hash values associated with the k-grams, where (k>0);
(a2) filtering the values to identify at least one special hash value associated with at least one k-gram; and
(a3) delimiting the data-packet stream into at least two data-packet segments based on location within the data packet of the at least one k-gram associated with the at least one special hash value.

13. The apparatus of claim 12, wherein:
the apparatus is configured to perform the hash function by generating a plurality of hash values corresponding to a plurality of k-grams within a window of size w, where (k<w); and
the apparatus is configured to filter the hash values by selecting the at least one special hash value associated with the at least one k-gram as the minimum hash value within the window.

14. The apparatus of claim 11, wherein the apparatus is further configured to segment said symbol pattern into at least a head block, a core block, and a tail block, wherein said pattern segment corresponds to one of the head block, the core block, and the tail block.

15. The apparatus of claim 11, wherein the apparatus is configured to compare each of the plurality of data-packet segments with the pattern segment using a single variable-stride discrete finite automaton (VS-DFA).

16. The apparatus of claim 15, wherein the VS-DFA is constructed using an alphabet comprising at least two core blocks.

17. The apparatus of claim 15, wherein the VS-DFA includes a quasi-state corresponding to one of at least two different possible pattern matches, wherein determining a pattern match among the at least two different possible pattern matches is a function of head and tail blocks.

18. The apparatus of claim 15, wherein:
said symbol pattern corresponds to a first symbol sequence; and
the VS-DFA is constructed using an alphabet that includes at least the pattern segment and a segment of a second symbol pattern corresponding to a second symbol sequence, the second symbol sequence being different from the first symbol sequence.

19. The apparatus of claim 11, wherein the apparatus is further configured to:
(c) consolidate at least one sequence of p consecutive single-symbol data-packet segments into a single p-symbol data-packet segment, where (p>1); and
(d) consolidate at least one single-symbol data-packet segment into an adjacent multi-symbol data-packet segment.

* * * * *